US007664588B2

(12) United States Patent
Runde et al.

(10) Patent No.: US 7,664,588 B2
(45) Date of Patent: Feb. 16, 2010

(54) ENGINE OVERRATE DETECTION METHOD AND APPARATUS

(75) Inventors: Jeffrey K. Runde, Fishers, IN (US); John P. Kresse, Martinsville, IN (US); Brett R. Caldwell, New Palestine, IN (US); Andrew L. Mitchell, Indianapolis, IN (US); Phillip F. Mc Cauley, Zionsville, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 145 days.

(21) Appl. No.: 11/565,066

(22) Filed: Nov. 30, 2006

(65) Prior Publication Data

US 2008/0133078 A1 Jun. 5, 2008

(51) Int. Cl.
*B60T 7/12* (2006.01)

(52) U.S. Cl. ............................ 701/84; 701/29; 477/107

(58) Field of Classification Search ................... 701/29, 701/54, 99, 84; 477/3, 5, 123, 107, 115; 303/10

See application file for complete search history.

(56) References Cited

U.S. PATENT DOCUMENTS 5,505,673 A * 4/1996 Tsukamoto et al. ......... 477/130
5,667,451 A * 9/1997 Park ............................ 475/44
5,853,347 A * 12/1998 Aoki et al. .................... 477/45
7,229,381 B2 * 6/2007 Niessen et al. ................. 477/3
2007/0116013 A1 * 5/2007 Brown et al. ........... 370/395.53

* cited by examiner

*Primary Examiner*—Tuan C To
*Assistant Examiner*—Redhwan Mawari

(57) ABSTRACT

A method is provided for determining variance of actual engine torque from reported engine torque, including configuring a controller with an algorithm to calculate the ratios of current and maximum engine torque to reported torque upon the initiation of high-throttle 1-2 shift, high-throttle 2-3 shift, high-throttle torque converter lockup, and at maximum Engine Rating Torque Function for each high-throttle torque converter drive cycle. An apparatus is also provided for detecting engine torque variance in a vehicle having an engine, a throttle, and a torque converter, the apparatus comprising a controller with memory and an algorithm for calculating the maximum and current engine torque variance upon the occurrence a predetermined throttle condition, and storing the values in accessible memory, wherein the controller is configured to initiate the algorithm upon the occurrence of one of the throttle conditions, and wherein the throttle and torque converter each communicate speed signals to the controller.

4 Claims, 2 Drawing Sheets

| THROTTLE EVENT | DESCRIPTION |
|---|---|
| 1 | INITIATION OF HIGH-THROTTLE 1-2 SHIFT |
| 2 | INITIATION OF HIGH-THROTTLE 2-3 SHIFT |
| 3 | INITIATION OF TORQUE CONVERTER LOCKUP CLUTCH APPLY |
| 4 | $ERTF_{MAX}$ FOR EACH TORQUE CONVERTER DRIVE CYCLE |

| THROTTLE EVENT | DESCRIPTION |
|---|---|
| 1 | INITIATION OF HIGH-THROTTLE 1-2 SHIFT |
| 2 | INITIATION OF HIGH-THROTTLE 2-3 SHIFT |
| 3 | INITIATION OF TORQUE CONVERTER LOCKUP CLUTCH APPLY |
| 4 | $ERTF_{MAX}$ FOR EACH TORQUE CONVERTER DRIVE CYCLE |

ENGINE OVERRATE DETECTION METHOD AND APPARATUS

TECHNICAL FIELD

The present invention relates to an apparatus and method for determining the variance of an actual torque from a reported torque of a vehicle engine, the apparatus and method being suitable for detecting the potential use of a torque up-rating kit on the engine.

BACKGROUND OF THE INVENTION

Vehicle transmissions are designed to transmit rotational force, i.e. torque, from an engine to the point of use, such as the drive axles or drive wheels, in order to propel the vehicle at a relatively wider range of output speeds. While an engine is generally designed to produce a sufficient known input or reported engine torque within a relatively narrow range of engine rotational speed, the vehicle itself preferably operates over the wider range of output speeds. Manual and automatic transmissions are typically configured to work in conjunction with an engine having a known reported torque in order to safely enable engagement with the transmission over the comparatively wide band of transmission output speeds while still enabling smooth or fluid gear shifting across the entire range of output speeds.

Although vehicle engines are designed and sized to perform at a specific, known, or reported torque range, various aftermarket kits or devices are able to boost or "up-rate" the engine torque well above the reported torque, for example by boosting or increasing the amount of fuel fed to the engine from the electronic fuel injector system. Such aftermarket devices are generally not authorized by the vehicle manufacturer due to the potential damage such devices may inflict on the engine and/or the various interconnected components of the transmission. Since these torque up-rating kits also commonly void manufacturer's warranties by altering the output of the engine and transmission beyond their intended operating parameters, vehicle owners may be inclined to disconnect and remove the torque up-rating kits before returning the vehicle for transmission or engine service in order to render detection of the prior use of the up-rating kits or devices difficult to ascertain.

SUMMARY OF THE INVENTION

Accordingly, a method is provided for determining the variance of the actual engine torque from the reported engine torque in a vehicle having a hydrodynamic torque converter, including configuring a controller with accessible memory and an algorithm for determining and storing the variance into the accessible memory upon the occurrence of at least one predetermined throttle event, wherein the stored variance is accessible for determining the presence and amount of the variance.

In another aspect of the invention, the current and maximum variance is generated by calculating ratios of the current and maximum actual torque to the reported torque, wherein a ratio greater than 1 indicates a torque variance, and wherein the predetermined throttle event is selected from the group consisting of initiation of high-throttle 1-2 shift, initiation of high-throttle 2-3 shift, initiation of high-throttle torque converter lockup, and at each maximum Engine Rating Torque Function for each high-throttle torque converter drive cycle.

In another aspect of the invention, the method or algorithm includes calculating the torque converter pump torque and the engine inertia torque, estimating the engine torque by adding the torque converter pump torque to the engine inertia torque, determining the reported engine torque, calculating a ratio of the actual engine torque to the reported engine torque, and storing the ratios in accessible memory, wherein the accessible memory may be accessed to determine a potential prior or current use of an engine torque up-rating kit.

In another aspect of the invention, an apparatus is provided for detecting a variance of actual engine torque from reported engine torque in a vehicle having an engine, a throttle, and a hydrodynamic torque converter, the apparatus comprising a controller with accessible memory and an algorithm for calculating the maximum and current actual engine torque upon the occurrence of one of a plurality of predetermined high-throttle conditions, and for generating and storing a ratio of the current and maximum actual engine torque to the reported engine torque in the accessible memory.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
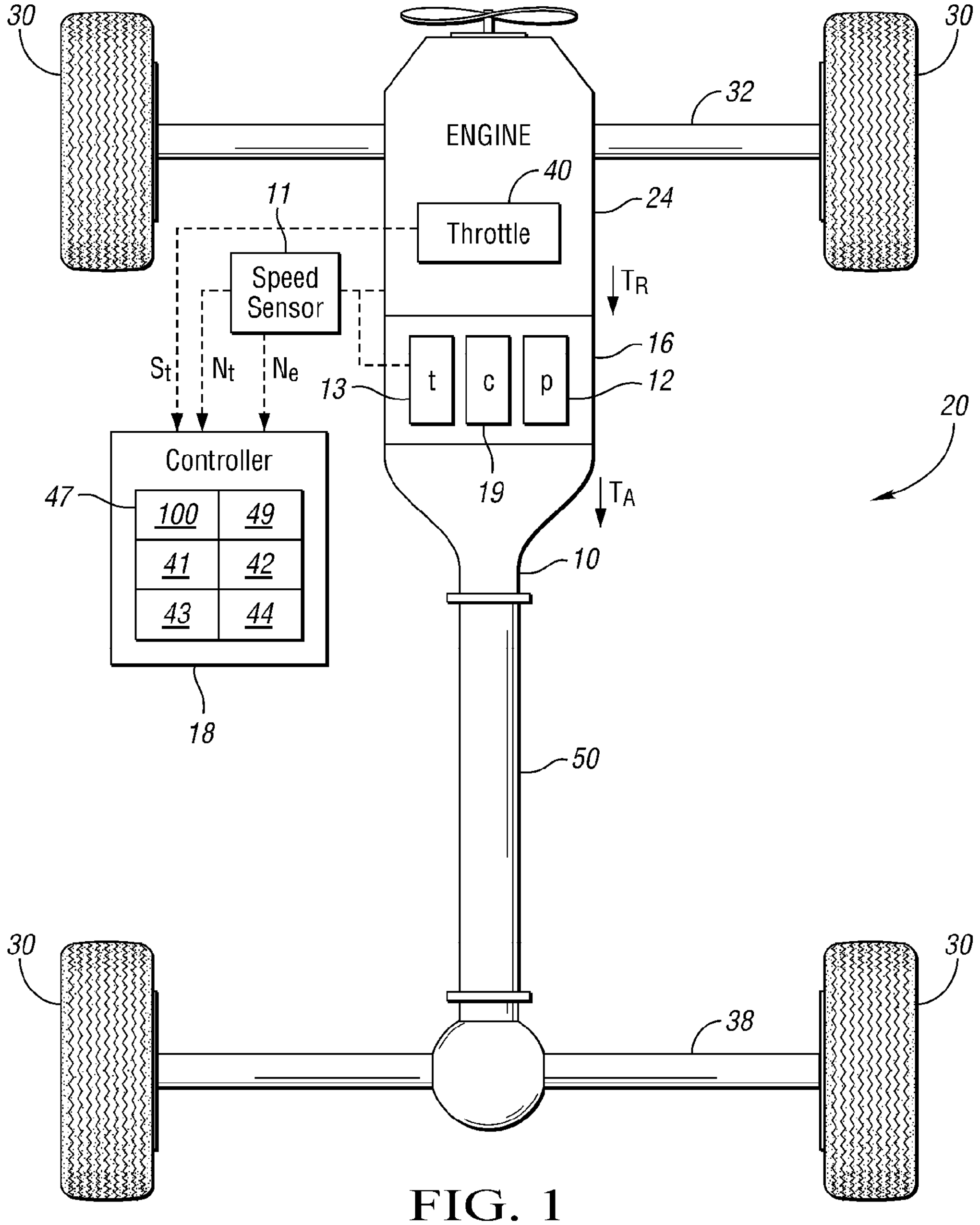
FIG. 1 is a schematic representation of a vehicle having a controller, hydrodynamic torque converter, and engine according to the invention.
FIG. 2 is a table describing four high-throttle events used with the engine torque variance detection method according to the invention.

Referring to the drawings wherein like reference numbers correspond to like or similar components throughout the several figures, there is shown in FIG. 1 a schematic representation of a vehicle chassis 20 having an engine 24 capable of generating a known or reported torque (arrow $T_R$), which is transmitted to a transmission 10 through a hydrodynamic torque converter 16. The transmission 10 is operatively connected to a driveshaft 50, which conveys an actual torque (arrow $T_A$) to one or both front and rear axles 32 and 38, respectively, to power or drive a plurality of wheels 30. The engine 24 and torque converter 16 are in electrical communication with a control unit or controller 18 having memory 47 that is configured for storing and accessing an algorithm 100 (see FIG. 3), temporary memory 49, and a plurality of storage arrays 41, 42, 43, and 44, each capable of storing sufficient amount of data, as described in further detail hereinbelow.

The torque converter 16 is preferably a conventional hydrodynamic torque converter having a stator (not shown), pump 12, turbine 13, and lockup clutch 19 of the type known in the art. As is understood in the art, pump 12 is directly connected to the engine 24 to rotate in conjunction therewith at engine speed, and the turbine 13 is driven by the fluid (not shown) discharged by pump 12, with turbine 13 being operatively connected to the transmission 10. The controller 18 is configured to receive a turbine speed signal and an engine speed signal, $N_t$ and $N_e$ respectively, from a speed sensor 11. Speed sensor 11 is of the type known in the art and is capable of measuring the rotational speeds of the engine 24, pump 12, and turbine 13, with the measured quantity $N_e$ alternately measured either at the pump 12 or directly at the engine 24 to which the pump 12 is directly connected. A throttle signal $S_t$ is generated by the throttle 40 and continuously transmitted or otherwise communicated to the controller 18.

The controller 18 is preferably an electronic control unit sufficiently equipped with various electric circuit components (not shown) configured for receiving, reading and/or measuring, calculating, and recording or storing various measurements, values, or figures, whether directly or derived from the speed signals Ne and Nt and from throttle signal $S_t$. The signals $N_e$, $N_t$, and $S_t$ are preferably transmitted electrically via conductive wiring, although any transmitting means such as, for example, radio frequency (RF) transmitters and receivers suitable for conveying or transmitting the required information to the controller 18, are usable within the scope of the invention.

As shown in FIG. 1, the controller 18 preferably has four arrays or buffers 41, 42, 43, and 44, respectively. Each array 41, 42, 43, and 44 is dedicated to storing a suitable number or set of measured values which are measured, derived, or calculated and subsequently recorded during a corresponding one of the four throttle events shown in FIG. 2. Arrays 41, 42, 43, and 44 are preferably circular buffers configured to replace the oldest value or sample with the newest value or sample once the buffer has reached capacity. Also, data being written to or stored in the arrays 41, 42, 43, 44 preferably employ a continuous first order lag filter capable of real-time filtering of newly sampled data, which may in turn reduce the need for a large capacity array or buffer by performing a weighted average or other suitable filtering operation on the new and previously recorded or stored data.

Turning to FIG. 2, a table is shown listing the four preferred throttle events for use with the invention. The first throttle event (1) occurs at the initiation of a high-throttle 1-2 shift, with "high throttle" referring to the relative position of the throttle 40 with respect to a minimum throttle level above which a user of the invention might wish to monitor. The term "high-throttle" refers to a throttle position equal to or greater than the mid-point of the available throttle range, i.e. 51% of maximum available throttle, although a higher throttle position may be selected within the scope of the invention. The term "1-2 shift" refers to a gear shifting event that changes the gear setting within the transmission 10 (see FIG. 1) from first to second gear. Likewise, the second throttle event (2) occurs upon the initiation of a high-throttle 2-3 shift. The third high-throttle event (3) occurs at the initiation of a high-throttle converter lockup-apply shift, with "converter lockup-apply shift" referring to a high-throttle gear shifting event occurring during the application of the torque converter lockup clutch 19 (see FIG. 1). Once the lockup clutch 19 is engaged, the speed across the torque converter 16 is necessarily constant, and therefore the application or engagement of the lockup clutch 19 marks the final moment at which the required speed signals $N_e$ and $N_t$ would differ. Finally, the fourth high-throttle event occurs at maximum value of the Engine Rating Torque Factor ($ERTF_{max}$) for each "high-throttle converter drive cycle", i.e. the time period elapsing during high-throttle when the transmission 10 (see FIG. 1) is in "drive", lasting until either the lockup clutch 19 is applied or until "drive" is disengaged. This final high-throttle event captures various data points also captured by the previous three high-throttle events, but also potentially covers other data points occurring between shifting events. While the four listed high-throttle events are the preferred throttle events for use with the invention, those skilled in the art will recognize that various other throttle events may be selected to capture data points occurring during other desired operating conditions.

Figure 3:
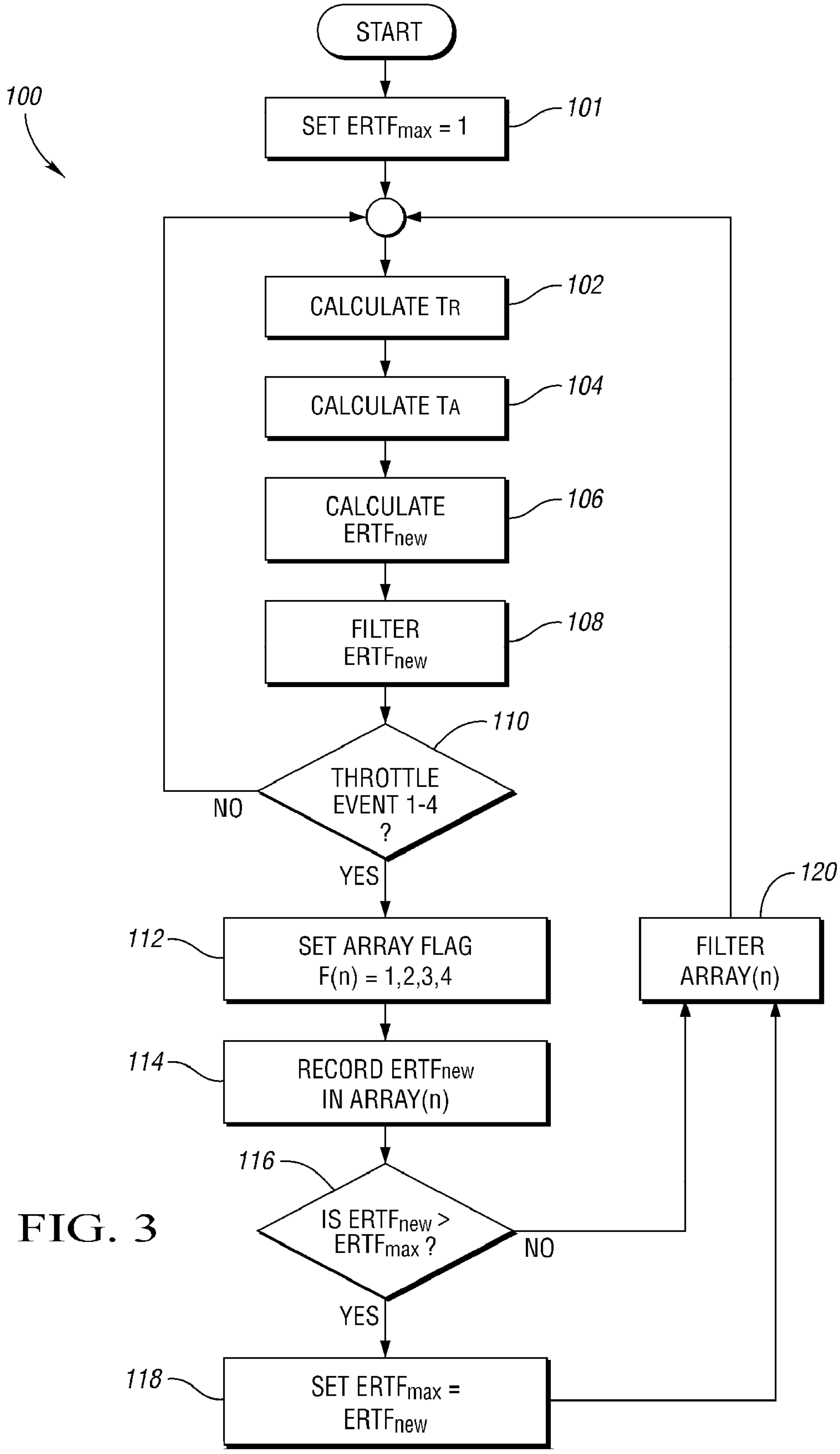
FIG. 3 is a flow chart describing the method or algorithm according to the invention for detecting the potential prior or current use of torque up-rating kit.

Referring now to FIG. 3, a method 100, also referred to herein as algorithm 100, is shown for detecting a variance in the calculated or actual torque $T_A$ from the reported engine torque $T_R$(see FIG. 1). Such a variance or discrepancy may result from the installation and use of, for example, an aftermarket engine torque up-rating kit capable of boosting the reported engine torque $T_R$. Algorithm 100 is preferably a computer program or source code embedded or contained within the controller 18 (see FIG. 1), with the algorithm 100 being initiated and executed according to a preset sample frequency, preferably every 20-30 milliseconds.

At step 101, which occurs only once and preferably upon placement of the vehicle into service, the value of the Engine Rating Torque Factor, or $ERTF_{max}$(described later hereinbelow), is set to 1 to create a baseline value useable with the remainder of the algorithm 100. The algorithm 100 proceeds to step 102.

At step 102, the algorithm 100 calculates, measures, or otherwise determines the known or Reported Torque $T_R$ of engine 24 (see FIG. 1). $T_R$ is preferably previously determined and stored within memory 47 of controller 18, and so is readily retrievable from the memory 47 as needed. The algorithm 100 then proceeds to step 104.

At step 104, the algorithm 100 calculates the actual torque $T_A$ generated by the torque converter 18 (see FIG. 1). One method of determining $T_A$ is to directly measure the shaft torque at the shaft connecting the engine 24 and the torque converter 16 using a torque meter (not shown), and to store this value in temporary memory 49. Another method of determining $T_A$ is to calculate the pump torque $T_p$, i.e. the torque generated by pump 12 of the torque converter 16, using torque meter and to store this value in temporary memory 49. $T_P$ may also be calculated using a standard-form torque converter equation derived from the engine and turbine speeds $N_e$ and $N_t$, respectively, which as previously explained hereinabove are communicated to the controller 18 by speed sensor 11.

Under this standard-form equation, $T_p=a(N_e)^2+b(N_e)(N_t)+c(N_t)^2$, where the variables a, b, and c are known calibration constants. Once the calculated or measured value of $T_p$ is stored in temporary memory 49, the algorithm 100 next calculates or inputs a previously calculated and stored value for the engine inertia torque $T_{Ei}$ of the engine 24, which may be calculated by measuring the rotational inertia $I_E$ of the engine 24, i.e. the resistance of the engine 24 to a change in its state of rotational motion, and multiplying $I_E$ by the rate of acceleration $a_c$ of engine 24. The result of this operation, i.e. $T_{Ei}=(I_E)(a_c)$, is stored in temporary memory 49. The variables $T_P$ and $T_{Ei}$ are then added together to calculate the Actual Engine Torque ($T_A$). The result of this operation, i.e. $T_R$, is stored in temporary memory 49 of the controller 18. The algorithm 100 then proceeds to step 106.

In step 106, the algorithm 100 calculates the Engine Rating Torque Factor ($ERTF_{new}$), which is the ratio of the most recently recorded values $T_A/T_R$, and records this value temporary memory 49 of controller 18. The algorithm 100 then proceeds to step In step 108, the algorithm 100 filters the value of $ERTF_{new}$ generated in step 108 in order to remove noise, and stores the filtered value in memory 47. A first order lag filter of the type known in the art is the preferred filtering method, however those skilled in the art will recognize that other data filtering means may be suitable for use with this invention. Once the filtering routine is complete, the algorithm 100 proceeds to step 110.

It step 110, the algorithm 100 determines if one of the four preferred throttle events (see FIG. 2) has occurred. If one of the four preferred throttle events has occurred, the algorithm 100 proceeds to step 112. If, however, one of the four throttle events has not occurred, the algorithm 100 returns to step 102, with the sample loop comprising steps 102-110 preferably being rapidly repeated every 15-30 milliseconds.

In step 112, the algorithm 100 sets an Array Flag ($F_n$) to n=1, 2, 3, or 4, with the value "n" corresponding to one of the four preferred throttle events that has occurred, and proceeds to step 114, where the controller 18 records or stores the "n" value $F_n$ in temporary memory 49 to be used later as described hereinbelow. The algorithm 100 then proceeds to step 116.

In step 116, the algorithm 100 compares the stored value of $ERTF_{new}$ in array (n) to the stored value $ERTF_{max}$, which was initially set to 1 in step 101 when the vehicle was first placed in use. If $ERTF_{new}>ERTF_{max}$, the algorithm 100 proceeds to step 118. If, however, $ERTF_{new}<ERTF_{max}$ the algorithm 100 proceeds to step 120.

In step 118, the value $ERTF_{max}$ is set to equal the value of $ERTF_{new}$. As step 118 occurs just one time upon the occurrence of each high-throttle event (see FIG. 2), each of the arrays 41, 42, 43, and 44 will therefore retain a value for $ERTF_{max}$ corresponding only to the maximum ERTF value associated with that particular array. In this manner, the recorded value may be readily traced or tied to the throttle event upon which it occurred. The algorithm then proceeds to step 122.

In step 120, the recorded ERTF values are filtered to remove noise and provide a less variable set of data. For example, within each of the arrays 41, 42, 43, and 44, unusually high and/or low lying values may be dropped and the remaining values averaged in order to produce an average ERTF value for that array, which may be stored in memory 47 of controller 18. Alternately, newly recorded data may be compared to any stored data and filtered with a pre-selected calibration percentage multiplier in order to lessen the individual effect of a single data point on any recorded average. The size of the storage arrays 41, 42, 43, and 44 may be minimized by applying, for example, a first-order lag filter with a pre-selected calibration percent and storing only a single average value taken on a rolling basis using the previous and most current recorded ERTF value.

According to the invention, the values of $ERTF_{max}$ and any individual and/or average ERTF value stored in each of the arrays 41, 42, 43, 44 are preferably readily accessible, for example by using a data probe or other data retrieval mechanism applied to controller 18, in order to retrieve the stored data. A stored ERTF value of "1" represents a condition where the engine 24 is likely operating at its recorded torque value $T_R$, indicating that an aftermarket up-rate kit has most likely not been installed or previously used. A stored value greater than 1 represents a condition where the engine 24 at some point in time likely operated at an actual torque level $T_A$ above the recorded torque $T_R$, indicating a torque up-rating kit may have been employed or is currently being used in order to boost engine torque above its reported level. Based on the values retrieved from memory 47, service technicians using the invention may be better informed of vehicle performance history, and particularly to engine torque history, and therefore should be better able to diagnose and process warranty claims tied to the engine and/or transmission.

While the best modes for carrying out the invention have been described in detail, those familiar with the art to which this invention relates will recognize various alternative designs and embodiments for practicing the invention within the scope of the appended claims.

The invention claimed is:

1. A method for determining the use of an aftermarket engine torque up-rating device in a vehicle having an engine with an inertia torque, a controller having accessible memory, and a hydrodynamic torque converter having a torque converter pump and a turbine, the method comprising:

detecting a speed of the engine and a speed of the turbine;

calculating a pump torque of the torque converter pump as a function of the speed of the engine and the speed of the turbine;

measuring a rotational inertia and acceleration of the engine;

calculating the inertia torque of the engine by multiplying the rotational inertia and the acceleration of the engine;

calculating an actual engine torque by adding said pump torque of the torque converter pump and the inertia torque of the engine;

reading a predetermined reported engine torque of the engine from the accessible memory;

calculating a current value and a maximum value of a ratio of said actual engine torque to said reported engine torque based on a plurality of such ratio calculations;

storing said current value and said maximum value of said ratio in the accessible memory of the controller upon the occurrence of one of wherein said plurality of predetermined throttle events is selected from the group consisting of: initiation of a high-throttle 1-2 shift, initiation of a high-throttle 2-3 shift, initiation of a high-throttle torque converter lockup, and a detected presence of a maximum Engine Rating Torque Function for each high-throttle torque converter drive cycle; and accessing the accessible memory to determine said current value and said maximum value of said ratio;

wherein a variance of the actual engine torque from said reported engine torque as indicated by said current value and said maximum values of said ratio determines whether the engine torque up-rating device was used within the vehicle.

2. The method of claim 1, wherein said calculating a current value and a maximum value of a ratio of said actual engine torque to said reported engine torque includes filtering said current value of said ratio.

3. The method of claim 2, wherein filtering said current value of said ratio includes applying a first-order lag filter to said current value.

4. The method of claim 1, further comprising: transmitting a first speed signal from the hydrodynamic torque converter to said controller and transmitting a second speed signal from the engine to said controller; and calculating said pump torque using each of said first speed signal and said second speed signal.

* * * * *